Oct. 8, 1963  R. C. CALE  3,106,178
TRIM CONTROL DEVICE
Filed Nov. 22, 1961  2 Sheets-Sheet 1
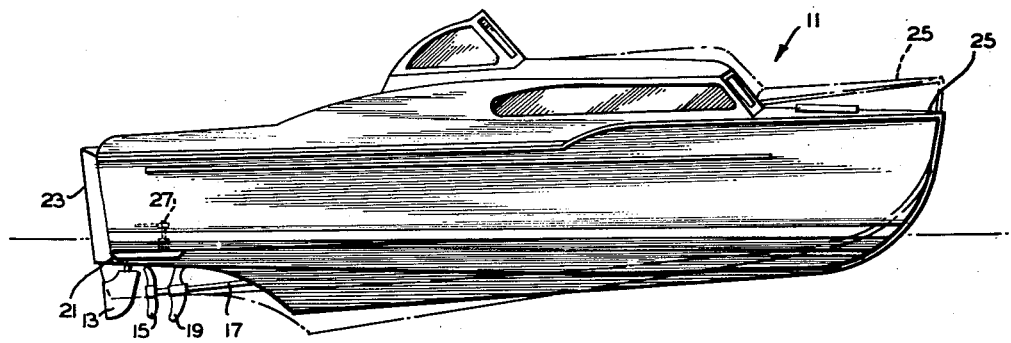
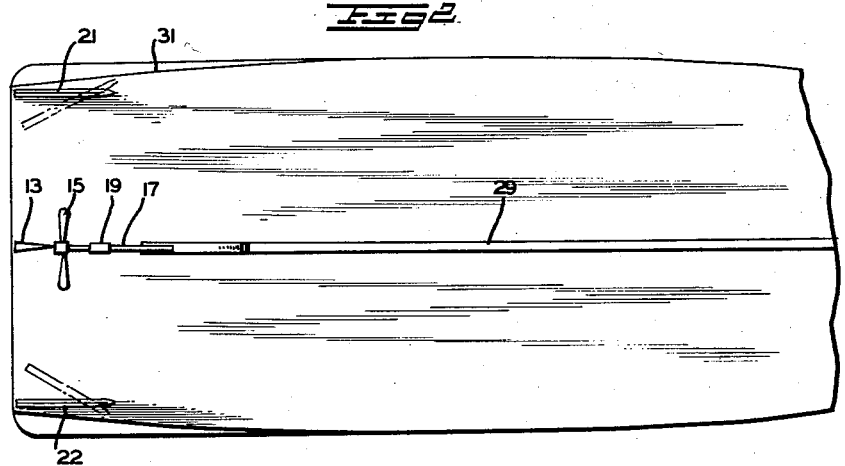
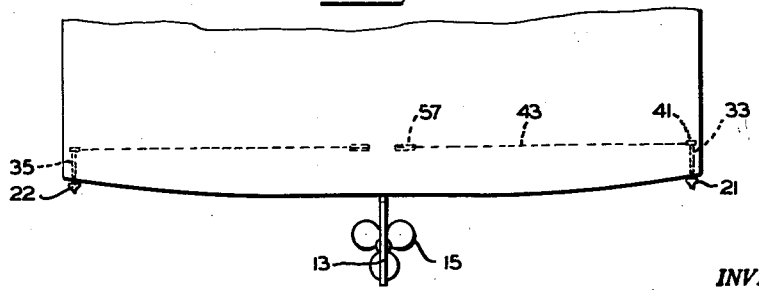
INVENTOR.
RICHARD C. CALE

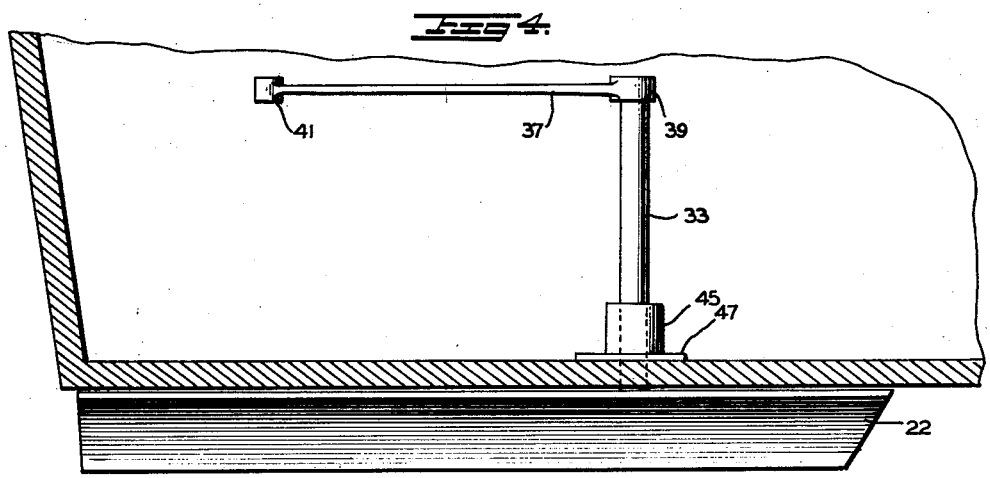
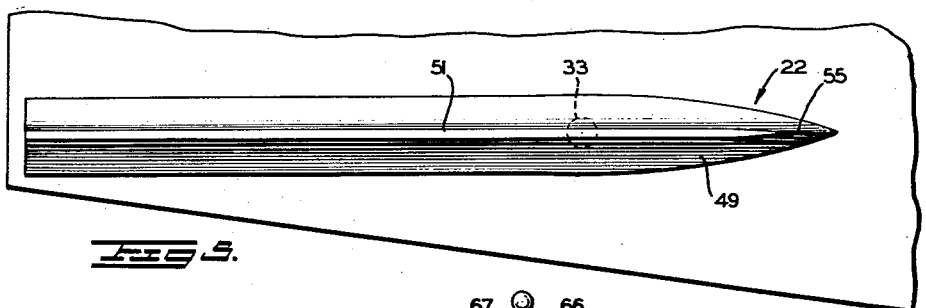
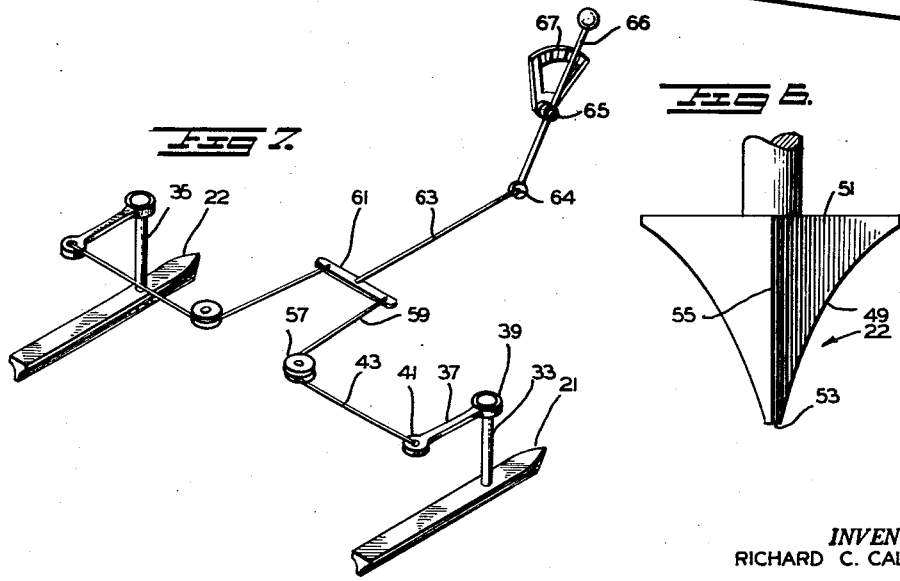
INVENTOR.
RICHARD C. CALE 3,106,178
TRIM CONTROL DEVICE
Richard C. Cale, 1129 Swanston Ave., Sacramento, Calif.
Filed Nov. 22, 1961, Ser. No. 154,270
8 Claims. (Cl. 114—66.5)

This invention relates to trim angle control and more specifically to apparatus designed to enable the operator to variably select a desired dynamic trim angle for a high speed planing hull.

In a planing hull resistance of the water passing over the hull is converted into kinetic energy at the points where the water is deflected to another direction by the force of the hull. Increased deflection of the effective horizontal flow of water results in an increase of the pressure upon the hull. In the forward area of a planing hull, where the first contact with the water occurs, the water is deflected to the greatest degree by the hull and therefore develops the greatest lift at this point. Succeeding areas aft encounter a water flow which has already been deflected from the horizontal and, as smaller units of the resisting force are changed to kinetic energy, the resultant lift on the hull decreases until in the aft region of the boat very little vertical lift occurs.

When the boat is operating in smooth water where speed is the major condition desired, the above effects are relatively unimportant. During smooth water operation boats in use today squat at the stern and assume a trim angle allowing the planing hull to contact the water near the center of the fulcrum leaving much of the forward hull free of contact with the water. While this is an excellent condition or attack angle for attaining high speeds, this type of operation in rough and choppy water will subject the hull to extreme pounding as it allows water to first contact the hull in the region near midships where insufficient deadrise exists to prevent the pounding.

If the trim angle were selectively reducible for such rough and choppy water conditions, it would allow the operator of the boat to reduce the trim angle so that the forefoot of the boat could make contact with the waves where sufficient deadrise in the hull exists to eliminate this extreme pounding. Although the speed of the boat would be slowed somewhat by reducing the trim angle because of the increased wetted surface, the benefits derived from the ability to negotiate rough water at planing speeds far outweigh such slight decrease in top speed performance.

Accordingly, it is an object of this invention to provide control surfaces on a planing hull for obtaining an optimum trim angle for planing conditions under various water conditions.

Another object of this invention is to provide apparatus for varying the hydrodynamic pressure in the aft region of the planing hull near the transom in order to vary the dynamic trim angle of the boat.

Yet another object of this invention is to provide apparatus for lowering the trim angle of a boat while operating in rough and choppy waters.

A further object of this invention is to provide apparatus for use with a planing hull which may be manually engaged to vary the trim angle of the hull at planing speeds under various water conditions.

A still further object of this invention is to provide apparatus for varying the trim angle of the planing hull which may be economically adapted for use with any existing planing boat.

These and other objects will be apparent to those familiar with the art from the following description when taken in conjunction with the drawings wherein:

FIG. 1 is an elevational view of a planing hull together with a phantom view illustrating the differing trim angles attained through the use of the present invention;

FIG. 2 is a partial bottom view of the hull of FIG. 1 illustrating the placement of the trim control members;

FIG. 3 is a partial rear view of the planing hull of FIG. 1;

FIG. 4 is a partial sectional view of a trim control member and the actuating apparatus therefor;

FIG. 5 is a partial view showing details of the trim control member;

FIG. 6 is a front elevational view of a trim control member; and

FIG. 7 is a schematic view of the actuating controls for the trim devices of the present invention.

Referring now more specifically to the drawings, the planing hull 11 is shown as being of more or less standard construction having a rudder 13, a screw 15 supported by a mounting structure 19 through which the shaft 17 passes. Just forward of the transom 23 a set of trim control devices 21 and 22, which in the present illustration are streamlined rails and will be referred to hereinafter as such, are located on the outer after section of the planing surface slightly forward of the transom 23 and are manually controllable through a mechanical device 27 which will be discussed in detail as the description proceeds.

As indicated in FIG. 2, the rails 21 and 22 may be rotated about a pivot point so that the aft portion of the rails swing inboard through a predetermined arc and may be rotated to any degree desired by the operator. The rails 21 and 22 are actuated and rotated through a substantially equal but opposite angle which results in the aft portion of the rails moving inboard and opposing each other as illustrated by the phantom lines. Thus, when the ends of the rails 21 and 22 are forced inwardly, they direct the flow of water passing over the hull downwardly and inwardly, raising the pressure across the full beam of the boat in the aft area. This results in a higher pressure across the aft area of the boat and lowers the trim angle and allows the operator to select the optimum trim angle for water conditions. In FIG. 1 the standard depiction of the craft shows it operating at a trim angle with the trim controls activated while the phantom view 25 shows the normal operating trim angle of the boat when the trim control rails 21 and 22 are inactivated.

The rails 21 and 22 are supported substantially adjacent to the planing surface by means of rods 33 and 35 which extend downwardly through the planing section and are sealed by means of standard water tight seals 45 and 47. These rods are integral with the rails 21 and 22 and, therefore, any movement which rotates the rods 33 and 35 will in turn rotate the rails.

In order that the rails present the least resistance to water when they are in their inactivated condition during planing speeds in smooth water, they are of a streamlined configuration as shown in FIGS. 4–6. One such satisfactory configuration has been to design the rail so that the forward edge is pointed with a gradual taper extending rearwardly as indicated. A further advantageous effect may be obtained by designing the sides of the rail 49 in a manner such that a concave or substantially concave surface is formed whereby the water which is confined by the two rails may be forced downwardly in a smooth manner thus avoiding unnecessary water turbulence. In the illustrative example shown the two opposite concave surfaces terminate in an apex 53 to form the finished rail.

It is to be understood that the primary purpose of the present invention is to increase the dynamic pressure of the water in the aft region of the hull and this may be accomplished to a degree by any shape of rail or trim control structure. However, it is noted that the larger the trim control surface the more resistance it presents to the water when in its inactivated condition and such resistance should, of course, be kept to a minimum. Various test results have shown that the trim control surfaces need not be large in size. Excellent results have been obtained with a well designed hull wherein the combined length of the two rails did not exceed one fourth the water line width of the transom with a depth from top to bottom of the rail or one twenty-fifth the entire length of the rail.

Since the rails have no activating force on them when not being used to reduce the trim angle, the streamlined configuration allows them to automatically feather themselves due to the pressure of the water and, therefore, they are substantially aligned parallel with the center line of the boat and cause no noticable drag when not in use. The rails may be made of any material but advantageously would be formed of a brass or some like metal.

Although the trim control devices may be moved separately, it is important that they be rotated oppositely to substantially the same degree of arc in order that no excessive force is exerted by one trim control over the other which would in turn create a certain amount of longitudinal instability in the craft. Accordingly, it is advantageous to control the movement of the trim control rails 21 and 22 substantially simultaneously by means of a device which will assure an equal degree of rotation of both of the rails.

The simplified manner of attaining the above desired results would be to use a standard line and pulley operation together with a central yoke as depicted in FIG. 7. An arm 37 is welded or secured to the shaft 33 so that any rotation of the arm 37 will rotate the shaft and the integral rail 21. A line 43 is secured to the outer end 41 of the arm 37 and passes over a pulley 57 with the other end of the line 59 being connected to one end of a yoke member 61. An identical arrangement is used for the opposite rail and is connected to the opposite end of the yoke 61. The control line 63 is then connected centrally to the yoke and extends to a control member such as a shaft 66 which is pivoted at 65 and may be rotated about the pivot by means of a knob or the like. The shaft 66 bears against a grooved arcuate member 67 in order that the trim controls may be set for different angles depending upon the particular sea conditions. The maximum trim control occurs when shaft 66 is in its extreme counterclockwise position and the control members are feathered when the shaft is in the extreme clockwise position. With this type of simplified operation, the yoke supplies an automatic adjustment between the two trim control members. Accordingly, as the knob is pivotally moved counterclockwise the arm members 37 are forced inwardly thus rotating the vertical posts 33 and 35 in opposite directions forcing the trailing edge of the rails 21 and 22 inwardly resulting in the above described increase in the dynamic water pressure.

The end result of the above operation creates a Venturi effect at the aft region of the planing hull thus forcing the stern of the boat upwardly with a resultant lowering of the bow of the boat giving the final reduction in the trim angle.

It should be noted that the point of connection between the vertical post 33 and the rail 22 is not critical insofar as the operation of the trim conrol device is concerned. The minimum trim angle will occur when the forward leading edge of the rail is approximately below the normal chine of the boat. When this point is reached a natural suction occurs behind and outboard of the rail. However, this suction is alleviated by the fact that air is pulled down along the aft section of the side of the hull thus aerating this negative pressure area and eliminating any ill effects therefrom. Because of the extreme pressures exerted on the rails it has been found that the point of location of the rod 33 on the rail 22 should be approximately one third aft of the leading edge of the rail. The reason for this location is that it allows actuation of the trim control devices without the need of extreme force by the operator.

It is to be understood that the above description and accompanying drawings are intended for illustrative purposes only and that various modifications of the particular structure and actuating means of the present invention could be used within the broad scope of this invention.

I claim:

1. In a high speed planing hull including a transom, a planing surface and at least one rudder, trim angle control apparatus comprising a set of substantially identical rail members, means for rotatably mounting said rail members on an axis of rotation substantially perpendicular to said planing surface on opposite sides of said rudder on said planing surface forward of said transom, and means for substantially simultaneously rotating said rails an equal degree in opposite directions.

2. In a high speed planing hull including a transom, a planing surface and at least one rudder, trim angle control apparatus comprising a first rail rotatably mounted on an axis of rotation substantially perpendicular to said planing surface on one side of said rudder on said planing surface forward of said transom, a second rail rotatably mounted on an axis of rotation substantially perpendicular to said planing surface on the opposite side of said rudder on said planing surface forward of said transom and means for rotating said rails substantially simultaneously a predetermined degree in opposite directions.

3. The apparatus of claim 2 wherein each each of said rails have a streamlined configuration whereby the force of the water passing over the planing surface aligns said rails parallel to the centerline of said planing hull when said rotating means is inactivated.

4. The apparatus of claim 2 wherein said rotating means rotates each of said rails an equal degree.

5. In a planing hull including a planing surface, a transom and at least one rudder, trim angle control apparatus comprising dual trim angle control means, means extending through said hull for substantially rotatably supporting said dual trim angle control means on an axis of rotation substantially perpendicular to said planing surface adjacent to the aft portion of said planing surface on opposite sides of said rudder and means for substantially simultaneously rotating said dual trim angle control means a predetermined degree in opposite directions.

6. The apparatus of claim 5 wherein said dual trim angle control means comprises two elongated rails.

7. The apparatus of claim 6 wherein said rotating means rotates said rails a substantially equal degree in opposing directions.

8. A high speed planing hull comprising a planing surface, at least one rudder and a transom, dual adjustable trim angle control means rotatably mounted on axes of rotation substantially perpendicular to said planing surface on opposite sides of said rudder on said hull for altering the hydrodynamic pressure of water on the planing surface forward of said transom and means for substantially simultaneously moving said trim angle control means in opposite directions.

References Cited in the file of this patent

UNITED STATES PATENTS

| | | |
|---|---|---|
| 923,648 | Gunnell | June 1, 1909 |
| 1,295,784 | Mittag | Feb. 25, 1919 |
| 1,529,036 | Richey | Mar. 10, 1925 |
| 1,536,940 | Sherburne | May 5, 1925 |
| 1,620,349 | Hickman | Mar. 8, 1927 |
| 1,805,131 | Donaldson | May 12, 1931 |
| 3,045,629 | Farrington | July 24, 1962 |

FOREIGN PATENTS

| | | |
|---|---|---|
| 8,472 | Great Britain | of 1908 |
| 495,637 | France | July 7, 1919 |
| 474,908 | Great Britain | Nov. 9, 1937 |
| 590,334 | Germany | Jan. 2, 1934 |